United States Patent [19]

Reiter

[11] 4,036,351

[45] July 19, 1977

[54] CONVEYOR BELT CLEANER

[75] Inventor: Robert C. Reiter, Aurora, Ill.

[73] Assignee: Material Control, Inc., Aurora, Ill.

[21] Appl. No.: 657,351

[22] Filed: Feb. 12, 1976

[51] Int. Cl.² .............................................. B65G 45/00
[52] U.S. Cl. ..................................... 198/499; 74/230; 137/124
[58] Field of Search ............... 198/230, 229, 188, 185, 198/499; 74/230; 137/124

[56] References Cited

U.S. PATENT DOCUMENTS

| 1,633,216 | 6/1927 | Lakeman | 198/230 UX |
| 3,315,794 | 4/1967 | Ellington | 198/230 |
| 3,342,312 | 9/1967 | Reiter | 198/230 |

Primary Examiner—Evon C. Blunk
Assistant Examiner—Douglas D. Watts
Attorney, Agent, or Firm—Cullen, Settle, Sloman & Cantor

[57] ABSTRACT

The conveyor belt cleaner serves as a mechanical cleaner for an endless conveyor belt entrained about a pair of pulleys and includes a vertically movable support adapted to be mounted on the frame of the conveyor transversely of the belt, with the support carrying a plurality of independently operable wiper blade assemblies for removing from the conveyor belt abrasive and other objectionable materials. A pair of manually operable jack screws are interposed between the conveyor frame and the support and which are effective upon rotation thereof to vertically move the support and wiper blade assemblies relative to the conveyor belt thus pressurizing the wiper blades of the assemblies against the belt. Each wiper blade assembly is independently mounted on the support by a mounting means including a spring interposed between the support and the corresponding wiper blade assembly for biasing the blade towards the belt. Adjustment means are provided for varying the biasing force or the effectiveness of the spring to insure proper pressure contact between the blade and the belt. If required, each wiper blade assembly may be adjusted independently of the others through the adjustment means associated with the spring of each wiper blade assembly.

8 Claims, 8 Drawing Figures

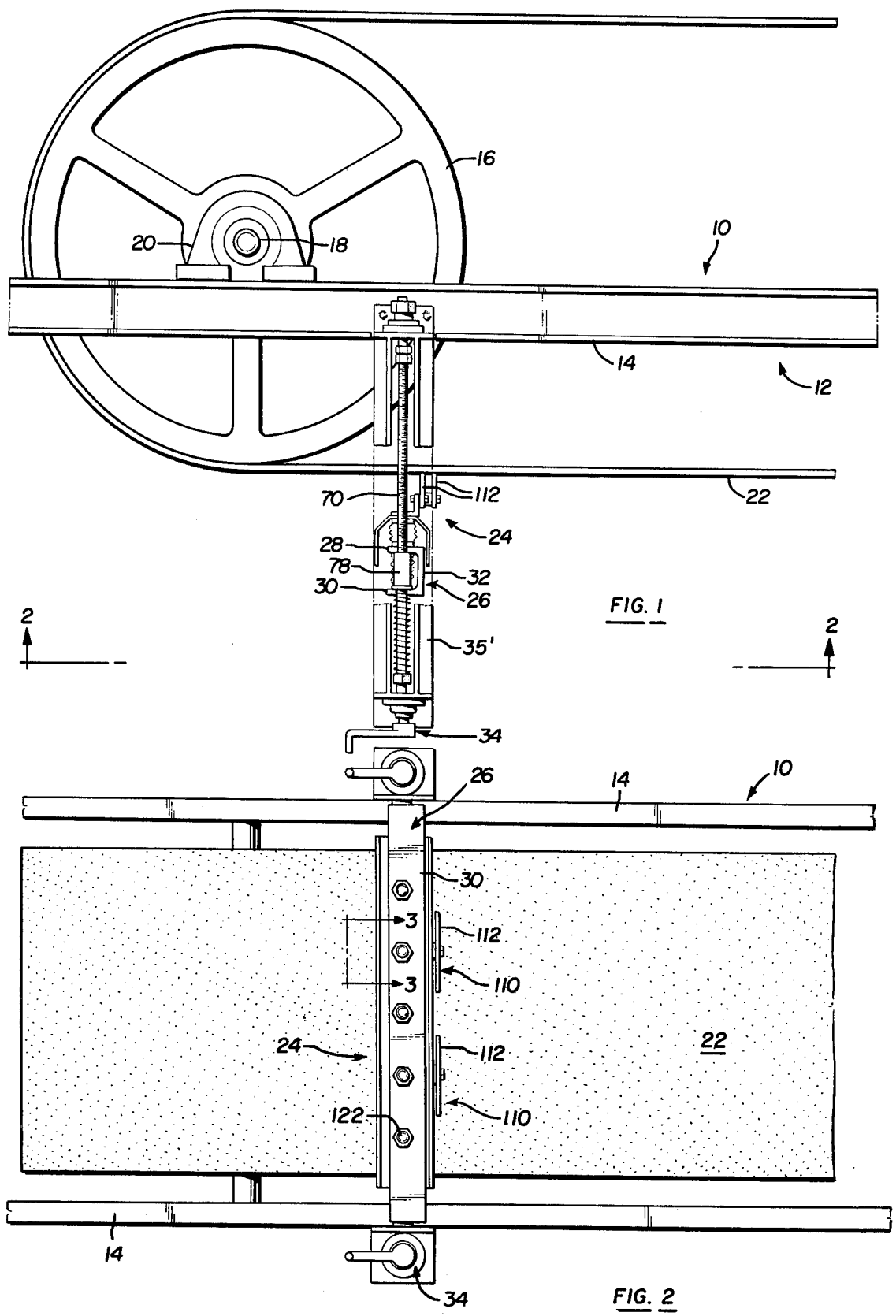

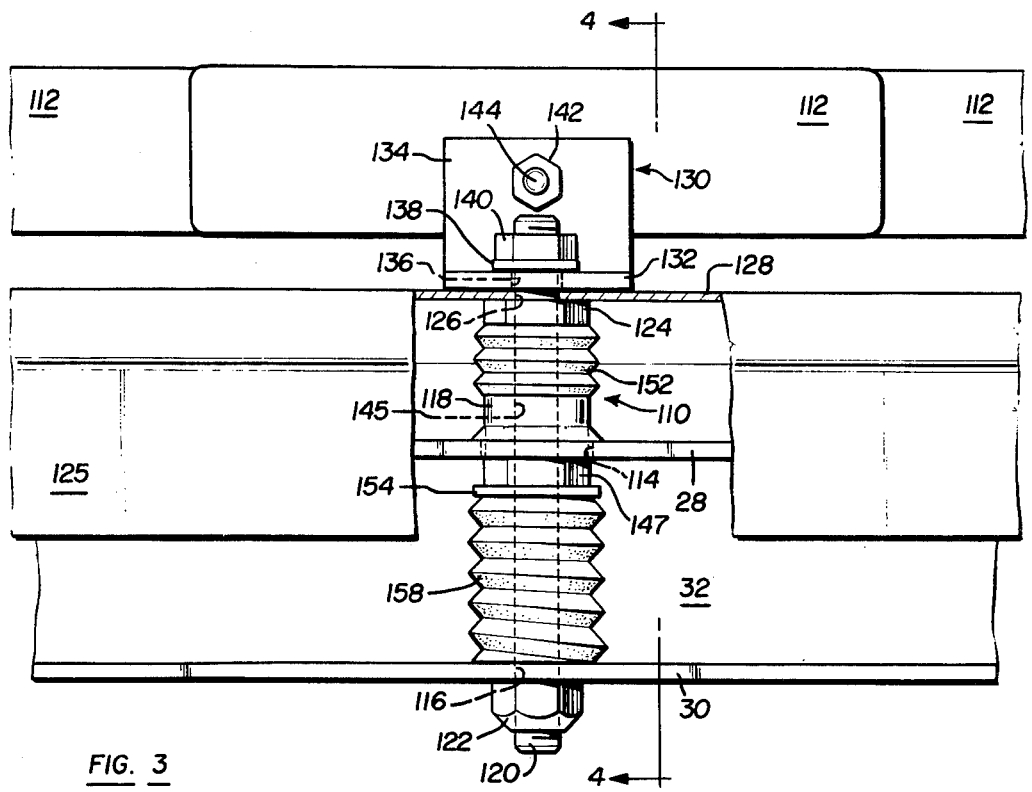
FIG. 3
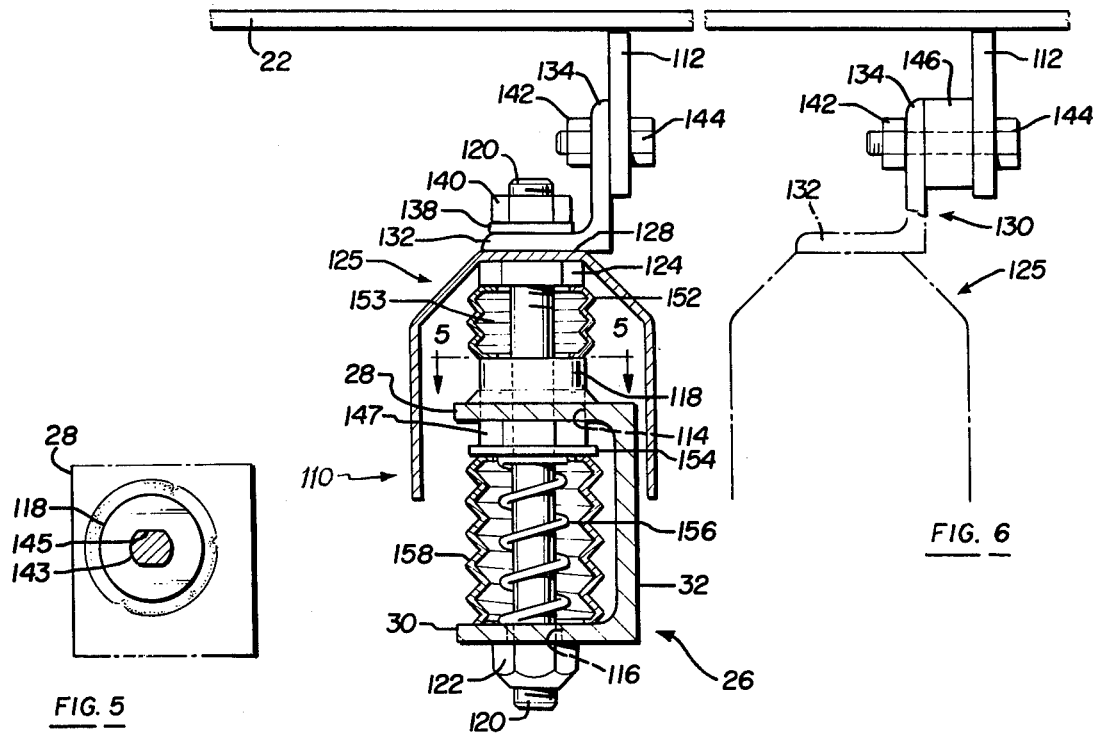
FIG. 5
FIG. 4
FIG. 6

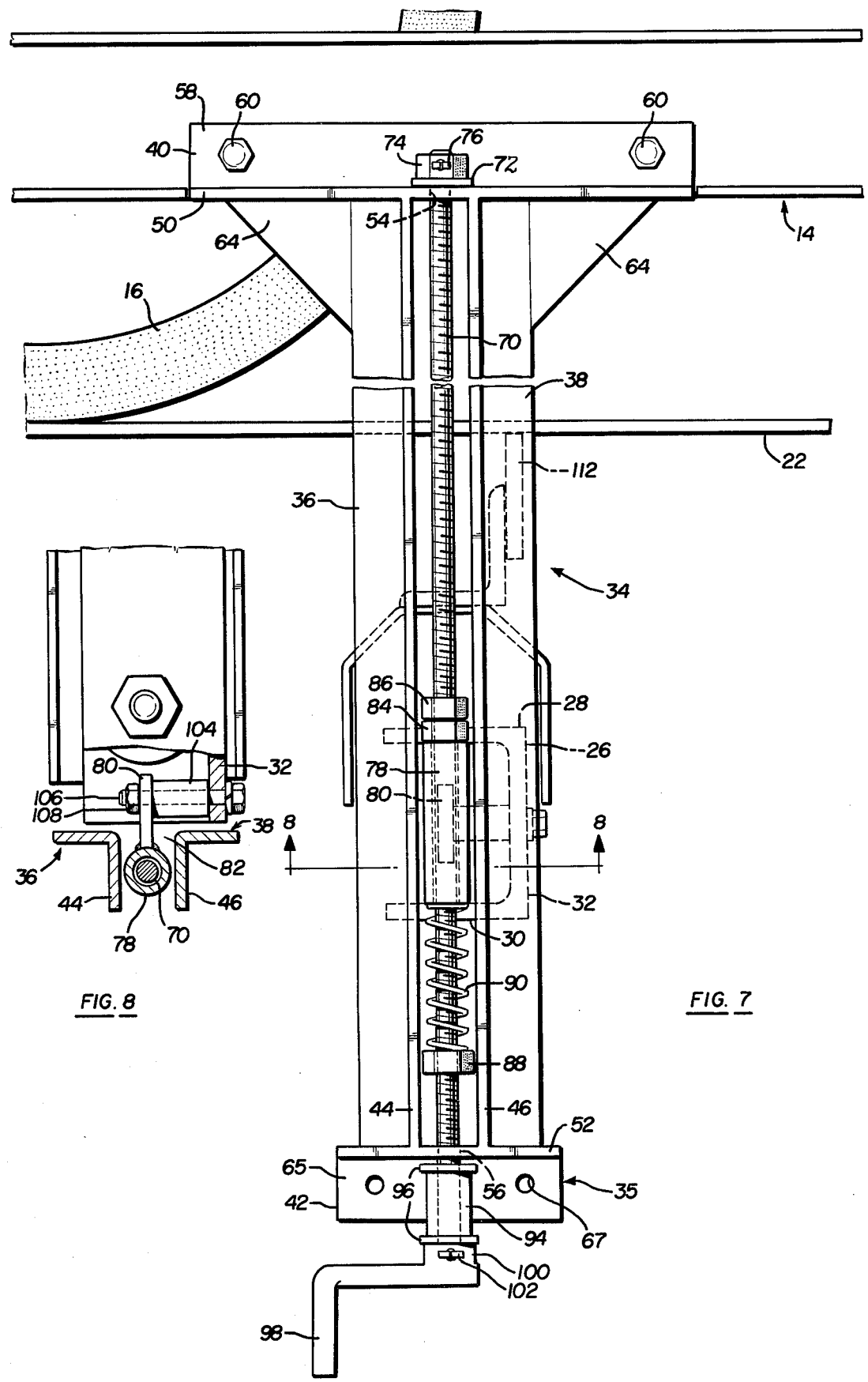

CONVEYOR BELT CLEANER

BACKGROUND OF THE INVENTION

1. Field of the Invention

A conveyor belt cleaner is for an endless conveyor belt entrained about a pair of rollers or pulleys and comprises a plurality of independently operable wiper blade assemblies for removing from the conveyor belt abrasive and/or foreign materials. Because of the tendency of the belt to accumulate adhering material, it is commonplace to provide beneath the return strand of the belt a plurality of wiper blade assemblies to remove this material, thus increasing the life of the belt.

2. Description of the Prior Art

My U.S. Pat. No. 3,342,312 dated Sept. 19, 1967, discloses a mechanical cleaner assembly mounted underneath the return run or strand of the conveyor belt and subjected primarily to bending and torsional forces. The cleaner includes a plurality of torsion springs or arms, each arm operating independently of the other. My patent as well as the McWilliams U.S. Pat. No. 3,656,610, dated Apr. 18, 1972, and the Sinden U.S. Pat. No. 2,794,540, dated June 4, 1957, each utilizes a cross angle, support or holder for carrying the spring arm wiper blades, with the holder being mounted for rotation. One end of the holder, as an example, is provided with an adjusting lever which is rotated thereby urging the wiper blades against the under side of the belt with enough pressure to insure contact and effective removal of the foreign material.

The present invention departs from the prior art in that a rotatable support or holder is not required in order to urge the blades against the belt to pressurize same. With the present invention, a pair of jack screws are interposed between the wiper blade support and the frame. The jack screws are rotated to vertically raise or lower the blade support member in order to urge the blades against the conveyor belt.

SUMMARY OF THE INVENTION

The present invention has certain economical and functional advantages over the prior art devices described previously.

It is a feature of the present invention to provide a conveyor belt cleaner for a conveyor including a frame, a drum carried by the frame and an endless belt trained about the drum and providing delivery and return runs, with the cleaner including a vertically movable support adapted to be mounted transversely of the belt to be cleaned, a wiper blade engageable with the belt, means for mounting the wiper blade on the support, and jack screw means adapted to be interposed between the frame and the support and effective upon rotation thereof to move the support and wiper blades relative to the belt to pressurize the cleaner.

Another feature of the present invention is to provide a spring type belt cleaner that requires a minimum amount of space beneath the belt. The cleaner requires about the same amount of vertical space as the prior art device but utilizes only one-third of the amount of horizontal space as the prior art devices. Space is usually at a premium at the place at which the cleaner should be installed.

Still another feature of the present invention is to provide a conveyor belt of the aforementioned type wherein the jack screw means comprises a threaded nut part and a threaded bolt part, with one part being carried by the support, and the other part being adapted to be secured to the frame.

Still another feature of the present invention is to provide a conveyor belt cleaner of the aforementioned type wherein the jack screw means comprises a pair of jack screws, one jack screw for each end of the support.

A further feature of the present invention is to provide a conveyor belt cleaner of the aforementioned type wherein the mounting means on the support for each wiper blade includes a compression spring interposed between the blade and the support for biasing the blade towards the belt.

A still further feature of the present invention is to provide a conveyor belt cleaner of the aforementioned type wherein adjustment means are provided for varying the biasing force or the effectiveness of the spring of each wiper blade assembly to provide proper contact between the blade and belt.

DESCRIPTION OF THE DRAWINGS

FIG. 1 is a fragmentary side view of the belt conveyor and of the mechanical cleaner therefor, with the cleaner mounted beneath the return strand or run of the conveyor belt and in an operative position;

FIG. 2 is a fragmentary bottom view of the belt conveyor and belt cleaner illustrated in FIG. 1 and looking in the direction of arrows 2—2 of FIG. 1;

FIG. 3 is a fragmentary side view of the belt cleaner taken on the line 3—3 of FIG. 2, with parts broken away to expose certain features thereof;

FIG. 4 is a view, partly in section, taken on the line 4—4 of FIG. 3;

FIG. 5 is an end view, partly in section, of one of the wiper blade assemblies taken on the line 5—5 of FIG. 4;

FIG. 6 is a fragmentary end view of one of the wiper blade assemblies of the cleaner;

FIG. 7 is a vertical elevational view of one of the jack screw assemblies; and

FIG. 8 is a sectional view taken on the line 8—8 of FIG. 7.

DESCRIPTION OF A PREFERRED EMBODIMENT

The conveyor illustrated in FIGS. 1 and 2 is designated by the numeral 10 and includes a frame 12 including a pair of longitudinally extending and laterally spaced I beams 14 which supports a pair of pulleys or rollers, with only the head pulley or roller being illustrated and designated by the numeral 16. The pulley 16 is mounted on a shaft 18 which is supported by lugs or bearings 20 carried by the I beam 14. Wrapped around the pulleys is an endless conveyor belt 22. The lift of the belt 22 may be extended by removing therefrom abrasive or foreign materials whether wet, dry or sticky. The belt 22 is cleaned by means of a mechanical belt cleaner designated by the numeral 24.

Mechanical belt cleaner 24 includes an elongated channel, beam or spring support member 26 of U-shaped cross section which extends transversely across and is spaced beneath or below the bottom surface of the conveyor belt 22 as shown in FIG. 2. The support member 26 has an upper flange 28, a lower flange 30, with the flanges 28 and 30 being connected by a vertically extending web 32. The flanges 28 and 30 are parallel and are located in horizontal planes.

A pair of manually operable jack screw assemblies 34 are interposed between the I-beams 14 of the frame 12 and the ends of support member 26, with one jack screw assembly 34 carried by and depending from each I-beam 14. Each jack screw assembly 34 includes a frame 35 made primarily from four elongated angle shaped members 36, 38, 40 and 42, each member having a pair of flanges located 90° apart. The angle members 36 and 38, which are of equal lengths, are arranged vertically and are spaced apart, with flanges 44 and 46 of said members 36 and 38 respectively, being parallel as best illustrated in FIGS. 7 and 8.

The upper angle member 40 includes a horizontal flange 50 which overlies and abuts the upper ends of the vertically extending angle members 36, 38 and is welded thereto. The lower angle member 42 has a horizontally extending flange 52 which overlies and abuts the lower ends of the vertically extending angle members 36, 38 and is welded thereto.

The horizontal flanges 50 and 52 of the upper and lower angle members 40 and 42 respectively are each provided with a centrally located opening 54, 56 respectively. Each jack screw assembly 34 is carried by one of the I-beams 14, with the flange 58 of the upper angle member 40 abutting against the web of the I-beam 14 and being secured thereto by a plurality of fasteners 60. Gusset plates 64, shown in FIG. 7, are flat and are welded to the upper support member 40 and the vertically extending angle members 36, 38. The vertical flange 65 of the lower angle member 42 is provided with a pair of bolt holes 67 so that the angle member 42 may be secured to a support, not shown, if required for stability purposes.

An elongated threaded rod 70, having a length greater than the length of angle members 36, 38 extends through the openings 54, 56 as best illustrated in FIG. 7. The upper end of the rod 70 is provided with a washer 72 which bears against the upper surface of the flange 50 by tightening of a threaded nut 74 which is connected by a cotter pin 76 to the rod 70.

An elongated circular collar 78 is provided on the rod 70 intermediate the ends thereof and has a flange 80 thereon which extends through the space 82 between flanges 44, 46 to be rearward side of the frame 35 as shown in FIG. 8. A pair of nuts 84, 86 are provided on the upper end of the collar 78. Another nut 88 is located beneath and is spaced from the collar 78 and provides an abutment surface for a compression spring 90 which is interposed between the bottom of the collar 70 and the top surface of the lower nut 88 as shown in FIG. 7.

The lower end of the rod 70 is provided with a spacer or sleeve 94 which is loose, with the spacer or sleeve 94 being interposed between a pair of washers 96 which are loosely spaced on the rod 70. A handle 98 is provided on the lower end of the rod 70, said handle 98 being welded to a nut 100 which is connected by a cotter pin 102 to the rod 70 as best illustrated in FIG. 7.

The flange 80 provided on the collar 78 is spaced from web 32 of support 26. A tubular spacer 104 is interposed between web 32 and flange 80. An elongated bolt 106 extends through web 32, spacer 104 and flange 80, with a nut 108 provided on the outer end of the bolt 106. Thus the end portions of the support 26 are connected to the jack screw assemblies 34.

The belt cleaner support 26 is adapted to carry a plurality of wiper blade assemblies 110, each assembly 110 mounted independently of one another on the support 26. Each wiper blade assembly 110 may be adjusted independently of the support 26 in order to conform the blade 112 of each assembly 110 to the sag in the conveyor belt 22. Each wiper blade assembly 110 is mounted on the support 26 in the same manner as will now be described in connection with FIGS. 3–5 inclusive.

Spaced inwardly from the ends of the support 26 at longitudinally spaced points thereon, are aligned openings 114, 116 provided in the upper and lower flanges 28 and 30 respectively. The opening 114 in the upper flange 28 is larger than the opening 116 in the lower flange 30. A collar 118 of tubular construction is located in the largest opening 114 in the upper flange 28 and welded to the flange 28. A threaded rod or shaft 120 extends through the collar 118 and through the upper and lower flanges 28, 30, with the lower end of the shaft 120 being provided with a lock nut 122. The upper end portion of the threaded rod 120 is provided with a first nut 124. An elongated dust shield 125 of generally U-shape construction, as best illustrated in FIG. 4, is provided with a series of openings 126 in the upper wall 128 for receiving the end portions of a series of shafts 120, one or more shafts being provided for each wiper blade assembly 110. Each assembly 110 also includes an angle bracket 130 having a horizontal flange 132 and a vertical flange 134. Flange 132 is provided with an opening 136 which is inserted over the threaded shaft 120. A washer 138 abuts the flange 132 and thereafter another nut 104 is threaded on the shaft 120. Thus the nuts 124 and 140 hold the dust shield 125 and brackets 130 on the vertically movable rods 120.

The wiper blade 112 is secured to the vertical flange 134 of the wiper blade support or angle 130 by means of a nut 142 and bolt 144. The adjacent wiper blades 112 are staggered by means of a spacer 146 provided on the bolt 144 between the wiper blade 112 and the vertical flange 134 of the wiper blade support 130 as best illustrated in FIG. 6.

When the bolt 120 is moved vertically the nut 147 threaded on rod 120 and washer 154 compress the spring 156. The collar 118 is necessary to provide shaft 120 with enough support to prevent binding. The nut 147 is located between the washer 154 and flange 28 of the support 26. In order to prevent the blade 112 from turning or rotating on rod 120, the collar 118 has a square opening 145 therethrough. The rod 120 has a pair of opposed flats 143 ground thereon which engage the corresponding surfaces of opening 145. With such a construction the rod 120 can move up and down but is prevented from rotating due to the engagement of the rod flats 143 with the surfaces of opening 145.

An expandable bellows 152 is provided between the nut 124 and the top of the collar 118 so as to enclose the space 153 surrounding the upper portion of the rod 120 (FIG. 4). A compression spring 156 surrounds the lower portion of the rod 120 between the lower flange 30 and the washer 154. Another expandable bellows 158 surrounds the rod 120 and the spring 156 between the washer 154 and the upper surface of the lower flange 30 as best illustrated in FIG. 4. The purpose of each of the bellows is to prevent dirt and foreign particles from entering the mechanism and interfering with the operation thereof.

In operation, when it is required to remove the belt cleaner 24 relative to the conveyor belt 22, the pair of jack screws 34 are rotated via the handles 98, each screw 34 being indivudually operated and rotated in a direction to raise or lower the belt cleaner 24 as required.

After adjustment of the entire belt cleaner assembly 24, it may be necessary to adjust one or more wiper blade assemblies 110 in order to conform the wiper blades 112 to the sag in or contours of the belt 22. This is accomplished by manipulating the lower lock nut 122 provided on the rod or shaft 120 of the wiper blade assembly 50.

As an example, if the nut 122 is threaded onto the shaft 120, the rod 120 and the nut 147 threaded thereon will move downwardly thereby further compressing the spring 156. As a result, the elongated dirt shield 125 and wiper blade 112 are also lowered, with the spring 156 exerting a larger force to urge the blade 112 against the belt 22.

If the nut 122 is threaded in a direction moving it off from the shaft or rod 120, the entire wiper blade assembly 110 is moved upwardly to keep the nut 122 in contact with the lower flange 30. As a result the force on the spring 156 is reduced resulting in a smaller force being applied by the spring 156 to bias the blade 112 against the belt 22.

What is claimed is:

1. A conveyor belt cleaner for a conveyor including a frame, a rotatable drum carried by the frame and an endless belt trained about the drum and providing delivery and return runs, said cleaner including a vertically movable support adapted to be mounted transversely of the belt to be cleaned, a wiper blade engageable with said belt, means for mounting said wiper blade on said support, and jack screw means adapted to be interposed between the frame and said support and effective upon operation thereof to move said support and wiper blade relative to the belt, and wherein said support includes a pair of spaced apart, generally horizontal upper and lower flanges connected by a vertically extending web, an opening in the upper flange, a tubular collar disposed about the opening in said upper flange, said collar being secured to said upper flange and extending from the upper side thereof, a threaded shaft extending through said collar and said flanges, abutment means secured to said shaft adjacent the lower side of said upper flange, a spring interposed between said collar abutment means and said lower flange for biasing said blade towards the belt, a wiper blade support secured to the upper end portion of said shaft, means securing said wiper blade to said wiper blade support, and adjustment means carried by said threaded shaft for varying the biasing force of said spring.

2. The conveyor belt cleaner defined in claim 1 wherein said spring is in the form of a compression spring.

3. The conveyor belt cleaner defined in claim 1 wherein a dirt shield is carried by said threaded shaft.

4. The conveyor belt cleaner defined in claim 1 wherein in a first expandable bellows surrounds a portion of said threaded shaft between said wiper blade support and said collar and a second expandable bellows surrounds another portion of said shaft and said spring between said collar and the lower flange of said support, said bellows protecting said shaft and spring from dirt.

5. The conveyor belt cleaner defined in claim 1 wherein said adjustment means is in the form of nuts threaded on said shaft.

6. A conveyor belt cleaner for a conveyor including a frame, a rotatable drum carried by said frame and an endless belt trained about the drum and providing a delivery and return runs, said cleaner including a nonrotatable support adapted to be mounted transversely of the belt to be cleaned, said support being adapted to move only in a vertical plane substantially normal to the plane of said belt, a pair of individually-operable jack screw means carried on opposite sides of said frame, said jack screw means being coupled to opposite ends of said support for selectively raising and lowering said support in said vertical plane toward and away from said belt, a plurality of individually-operable wiper blade assemblies each having a wiper blade engageable with a surface of said belt, means for mounting said plurality of individually-operable wiper blade assemblies on said support so as to minimize the amount of horizontal space adjacent said belt occupied by said cleaner, said mounting means including a compression spring assembly associated with each of said wiper blade assemblies for urging the individual wiper blade associated therewith toward the surface of said belt to be cleaned, each of said compression spring assemblies includes a compression spring interposed between said support and an individual wiper blade assembly for urging said wiper blade toward the surface of said belt to be cleaned, said compression spring assembly further includes means for individually adjusting the force with which said wiper blade is urged toward the surface of said belt to be cleaned independently of said jack screw means.

7. A conveyor belt cleaner for a conveyor including a frame, a rotatable drum carried by said frame and an endless belt trained about the drum and providing a delivery and return runs, said cleaner including a nonrotatable support adapted to be mounted transversely of the belt to be cleaned, said support being adapted to move only in a vertical plane substantially normal to the plane of said belt, a pair of individually-operable jack screw means carried on opposite sides of said frame, said jack screw means being coupled to opposite ends of said support for selectively raising and lowering said support in said vertical plane toward and away from said belt, a plurality of individually-operable wiper blade assemblies each having a wiper blade engageable with a surface of said belt, means for mounting said plurality of individually-operable wiper blade assemblies on said support so as to minimize the amount of horizontal space adjacent said belt occupied by said cleaner, said mounting means including a compression spring assembly associated with each of said wiper blade assemblies for urging the individual wiper blade associated therewith toward the surface of said belt to be cleaned, said support includes a pair of spaced apart, generally horizontal upper and lower flanges connected by vertically extending web, said upper and lower flanges being provided with opposed, vertically aligned apertures, the number of opposed, vertically aligned apertures corresponding in number to the number of said plurality of individually-operable wiper blade assemblies mounted on said support, said mounting means further including an elongated rod extending through each of said pairs of opposed, vertically aligned apertures, and an abutment member secured to each of said elongated rods at a location intermediate the ends thereof and between said upper and lower flanges, and wherein said compression spring assembly includes a compression spring disposed about said intermediate portion of said elongated rod and interposed between said abutment member and said lower flange for urging said elongated rod towards said conveyor belt, said mounting means further including a plurality of wiper blade supports, one of said supports being secured to an upper end portion of each of said elongated rods, means for securing one of said plurality of wiper blades to each of said wiper blade supports, and adjustment means carried by the lower end portion of said elongated shaft for selectively varying the biasing force of said compression spring.

8. The conveyor belt cleaner of claim 7 wherein said elongated rod is a threaded shaft; wherein said abuttment means includes a first nut threadedly secured to said threaded shaft adjacent a portion of said shaft extending through the aperture in said upper flange; and wherein said adjustment means includes a second threaded nut threadedly secured to the end portion of said threaded shaft which extends through the aperture in said lower flange such that the act of threading said second nut onto and off of said threaded shaft increases and decreases the biasing force of said compression spring.

* * * * *